United States Patent [19]
Neis et al.

[11] Patent Number: 5,097,193
[45] Date of Patent: Mar. 17, 1992

[54] METHOD AND APPARATUS FOR DIRECT REGULATION OF OUTPUT CURRENTS OF AN INVERTER FEEDING A PREDETERMINED NUMBER OF INDUCTION MACHINES

[75] Inventors: Erwin Neis, Erlangen; Ulrich Link, Baiersdorf; Günther Barthel, Röttenbach, all of Fed. Rep. of Germany

[73] Assignee: Siemens Aktiengesellschaft, Berlin & Munich, Fed. Rep. of Germany

[21] Appl. No.: 629,585

[22] Filed: Dec. 18, 1990

[30] Foreign Application Priority Data

Jan. 18, 1990 [EP] European Pat. Off. ......... 90101021.5
Jun. 19, 1990 [EP] European Pat. Off. ......... 90111550.1

[51] Int. Cl.$^5$ .............................................. H02P 5/40
[52] U.S. Cl. ..................................... 318/800; 318/809
[58] Field of Search ......... 318/800, 805, 803, 807–811

[56] References Cited

U.S. PATENT DOCUMENTS

| | | | |
|---|---|---|---|
| 4,609,983 | 9/1986 | Braun | 363/98 |
| 4,792,741 | 12/1988 | Matsuo et al. | 318/800 |
| 4,906,912 | 3/1990 | Trauth et al. | 318/809 |

Primary Examiner—David Smith, Jr.
Attorney, Agent, or Firm—Kenyon & Kenyon

[57] ABSTRACT

A method and apparatus directly regulate the output currents ($i_{RX}$, $i_{SX}$, $i_{TX}$) of an inverter that feeds a predetermined number of induction machines. This method and apparatus is applicable to an inverter feeding one or more induction machines without rotational speed actual value sensors. The regulation is achieved by means of a secondary current control to which is supplied a current command variable system ($i_{RW}$, $i_{SW}$, $i_{TW}$). According to the invention the current command variable system ($i_{RW}$, $i_{SW}$, $i_{TW}$) is determined from the inverter output currents ($i_{RX}$, $i_{SX}$, $i_{TX}$) and the state signals ($S_R$, $S_S$, $S_T$) of the current switches of the inverter, from a calculation of the actual values of the active and reactive powers ($P/U_d$, $P_q/U_d$) supplied to the motor, and a given rotational speed setpoint ($n_{set}$), using field-oriented variables and simulating the actual rotational speed ($n_{act}$). The actual values of the active and reactive powers ($P/U_d$, $P_q/U_d$) are converted into the actual values of the active and reactive currents ($i_{Wact}$, $i_{Bact}$), which are then converted into field-oriented actual values. From an actual value of a fundamental-r.m.s. of the inverter output voltage ($U_X$), the command value of the flux-forming current component ($i_{dW}$) is determined. Consequently the frequency converter output currents ($i_{RX}$, $i_{SX}$, $i_{TX}$) can be regulated directly achieving very good concentricity characteristics even at low output frequencies.

32 Claims, 5 Drawing Sheets

METHOD AND APPARATUS FOR DIRECT REGULATION OF OUTPUT CURRENTS OF AN INVERTER FEEDING A PREDETERMINED NUMBER OF INDUCTION MACHINES

BACKGROUND OF THE INVENTION

The invention relates generally to a method and a apparatus for the direct regulation of output currents of an inverter, and more particularly to such an inverter feeding one or more induction machines without rotational speed sensors. The inverter uses a secondary current control to regulate the output currents. The secondary current control receives a current command variable system.

"Drehzahlveränderbare Antriebe in der Praxis" pages 34 to 38, Siemens, Bereich Energie- und Automatisierungstechnik, Order No. A 19100-E319-A365, discloses a pulse frequency converter which outputs a three-phase current system of variable voltage and frequency for a predetermined number of induction machines. The pulse frequency converter comprises an uncontrolled power rectifier, a dc voltage intermediate circuit and a machine-side inverter. The power-side current converter generates from the supply voltage a constant dc voltage which is smoothed by capacitors in the intermediate circuit. The machine-side current converter forms from the constant dc voltage, a three-phase voltage system with variable frequency and voltage. Transistors or gate turn-off thyristors (GTO thyristors) are used as current switches for the inverter. The pulse patterns for driving the inverter are generated in the microprocessor drive unit. For this purpose pulse patterns are selected which ensure optimal operation with nearly sinusoidal motor currents and minimum total losses, over the entire setting range of the frequency converter. The drive and regulation of the pulse frequency converter is fully digital. All functions including drive unit, ease of operation, and extensive protective functions are processed via a 16 bit microprocessor. A vector regulator is provided as the regulator, which achieves high regulating dynamics. The magnetization current and the active current forming the torque are determined from the available actual motor current and voltage. These current components of the current vector are compared with the setpoints. The difference is eliminated by regulation. In this way, given torque setpoints can be adhered to exactly. Rotational speed actual value sensors are not required up to a rotational speed setting range of 1:10.

Due to unavoidable switching and delay times of the switches of the inverter and the drive circuit whose durations are variable and not exactly known in the individual case (depending upon for example the parameter spread of the electronic components instantaneous current, and temperature) the frequency conver.:r output voltage differs from the settings of the voltage drive unit. These erroneous voltage/time areas cause lower order harmonics and dc components in the output voltage, particularly with low frequency converter output frequencies. These harmonics lead to a non-sinusoidal curve of the output currents, to additional losses in the motor, and to concentricity properties which are not too good at low frequency converter output frequencies.

Marked improvement in the behavior of a drive is possible if the frequency converter outputs a regulated three-phase current system of variable frequency and amplitude, instead of a controlled voltage system. The non-ideal switching response of the power semiconductors as well as delay times occurring in the signal flow are detected by the regulator and eliminated by regulation.

DE 30 46 392 C2 discloses a method for controlling three-phase pulse inverters in which a three-phase sinusoidal current command variable system is given. The phase currents of an induction machine with a virtual neutral point following the pulse inverter are measured and compared to the command variable input. As a function of the deviation, the phases of the inverter are switched by means of hysteretic flip-flop controllers.

In groups drives wherein several motors, whose number can also be varied during operation, are connected in parallel, a field-oriented control cannot be employed. This results from the following facts:

(1) the different motors of the group drive can have different loads placed on the motors which cause the voltage drops across the winding resistances and across the leakage inductances to be different in each motor, which in each instance have a different phase position of the flux relative to the common inverter output voltage. If these motors are not equipped with a position detector the position of the flux cannot be determined.

(2) the number of motors of the group drive is not known since the number changes during operation, also the nominal value for the flux-forming current components depending on the number or the type of the motors present is also hot known.

"Drehzahlveränderbare Antriebe in der Praxis" discloses that in group drives, frequency control is provided as the variable regulation, with the voltage given as a function of frequency and with current limiters. With single motor drives, a vector regulator as a rotational speed regulator without a rotational speed sensor but with current and moment limiters is provided as the variable regulator.

The present invention is directed towards the problem of developing a method and an apparatus for the direct regulations of invertor output currents by means of a secondary current control wherein this invertor feeds one or more induction machines without rotational speed sensors.

SUMMARY OF THE INVENTION

The present invention solves this problem by calculating the actual values of an active current ($i_{Wact}$) and a reactive current ($i_{Bact}$) from the stator currents ($i_{Rx}$, $i_{Sx}$, $i_{Tx}$) and the state signals ($S_R$, $S_S$, $S_T$) of the current switches of the invertor. Then the method converts the actual value of the active current ($i_{Wact}$) <into an actual value of the torque-forming current ($i_{qact}$)> and the actual value of the reactive current ($i_{Bact}$) and, into an actual value of the flux-forming current ($i_{dact}$). Next, the method simulates the actual value of the rotational speed ($n_{act}$) by using the actual value of the torque-forming current ($i_{qact}$). The method then compares a given rotational speed setpoint ($n_{set}$) with the simulated actual rotational speed value ($n_{act}$), and generates a torque-forming current ($i_{qw}$) from this comparison. The method then compares the flux-forming setpoint of the current component ($i_{set}$) given as a function of the stator frequency ($f_1$) of the induction machine with the actual value of the flux-forming current component ($i_{dact}$) and generates a flux-forming command current ($i_{dw}$) from this comparison. The method transforms the flux-forming and torque-forming currents ($i_{qw}$, $i_{dw}$), which are field-oriented currents, into a stator-oriented current vector ($i_S$) and converts the stator-oriented current vector ($i_S$) into a command current variable system ($i_{Rw}$, $i_{Sw}$, $i_{Tw}$). Finally, the method supplies the command current variable system ($i_{Rw}$, $i_{Sw}$, $i_{Tw}$), to the secondary current control.

The basis of the regulation is supplying the actual values of the active and reactive currents to the motor which are calculated using the invertor output currents and the states of the inverter switches. The flux-forming and the torque-forming current components of the motor current are determined from these actual active and reactive currents, via an $R_S/X_o$ transformation which accounts for the resistance of the winding and the leakage inductance. The nominal value for the flux-forming components is obtained as a function of the frequency converter output frequency. The setpoint for the torque-forming current component is available as the output signal of a rotational speed controller wherein the actual rotational speed is simulated. The amplitude and the angle of the command current vector are determined from the calculated command variables for the two current components by means of a coordinate transformation.

A fast secondary current control ensures that the frequency converter output currents or the phase currents of the frequency converter-fed induction machine correspond at all times to the command variables given by the superior field-oriented regulation. This applies even for very low output frequencies so that even at low rotational speeds very good concentricity behavior can be achieved.

The present invention solves the problem for an inverter feeding several induction machines without speed sensors by calculating actual values of the active power ($P/U_d$) and reactive power ($P_q/U_d$) supplied to the induction machines from the output currents ($i_{Rx}$, $i_{Sx}$, $i_{Tx}$) and the state signals ($S_R$, $S_S$, $S_T$) of the current switches of the inverter. Then, the method calculates the actual value of a functional-r.m.s. of the output voltage ($U_x$) the actual values of the active current ($i_{Wact}$), and a reactive current ($i_{qact}$), from the actual values of the active and reactive power by using an absolute value of stator-oriented current vector ($\uparrow w$). Next, the method converts the actual active current ($i_{wact}$) <into the actual torque-forming current ($i_{qact}$)>, and the actual reactive current ($i_{Bact}$) and into the actual flux-forming current ($i_{dact}$). The next step simulates the actual rotational speed ($n_{act}$) by using the actual torque-forming current ($i_{qact}$). The next step compares the given rotational speed setpoint ($n_{set}$) with the simulated actual rotational speed ($n_{act}$) and generates a torque-forming current ($i_{qw}$) from this comparison. The next step compares the output voltage setpoint ($U_w$) of the inverter given as a function of the stator frequency ($f_1$) of the induction machines, with the actual output voltage of the inverter at a calculated fundamental frequency and generates the flux-forming current ($i_{dw}$) from this comparison. Next, the method transforms the flux-forming and torque-forming current components ($i_{qw}$, $i_{dw}$), which are field-oriented currents, into a stator-oriented current vector ($i_s$), and converts the stator-oriented current vector ($i_s$) into a current command variable system ($i_{Rw}$, $i_{Sw}$, $i_{Tw}$), and supplies the current command variable system ($i_{Rw}$, $i_{SW}$, $I_{Tm}$) to the secondary current control.

This method calculates the actual value of a fundamental-r.m.s. of the inverter output voltage from the actual values of the active and reactive powers supplied to the induction machines. These powers are calculated from the inverter output currents and the states of the current switches of the inverter by using the absolute value of a stator-oriented stator current. The actual value of a fundamental-r.m.s. of the inverter output voltage is compared with a setpoint of the inverter output voltage and forms a command variable of the flux-forming current component as a function of the resulting difference. The command variable of the torque-forming current component is generated in the same way as in the regulation of individual drives. In contrast to the regulation of individual drives, the regulation of group drives for the generation of the command variable of the field-oriented current components a setpoint and actual value of the flux-oriented current component are not compared with each other. Rather, a setpoint of the inverter output voltage, formed as a function of the stator frequency, is compared to the actual value of a fundamental-r.m.s. of the inverter output voltage formed from the active and reactive powers supplied to the induction machines. This method orients the flux of the individual motors of the group drive. The quality of this orientation is high, especially if the loads of the individual motors are approximately equal. In addition, through the calculation of the actual value of a fundamental-r.m.s. of the inverter output voltage it is possible to recognize where or not individual motors, during operation, are switched to or away from the group drives, and the command variable of the flux-oriented current component will be changed accordingly.

In an advantageous method for the determining the command variable of the flux-forming current component, the nominal value of the flux-forming current component is set equal to the command variable of the torque-forming current component. In application of this method, care should be taken that a minimum magnetization or a maximum magnetization (for example nominal magnetization) are never exceeded. For particularly small or particularly large loads corrections via a characteristic function are possible. In this way, the motor is magnetized according to a load whereby the active and reactive current supplied to the motor are of same magnitude. This means that the motor is operated at partial load with a phase angle of approximately 45° whereby the partial load efficiency of inverter and motor is raised to its maximum. In this way, the inverter and the motor are operated with the lowest possible losses. This load-adaptive magnetization offers the advantage that the possibility of operating with improved efficiency under partial load is not tied to a particular rotational speed-torque characteristic of the operating machine, but rather this is possible in any given drive.

The present invention also solves the problem of developing an apparatus for the direct regulation of the output currents of an inverter feeding an induction machine without a rotational speed actual value sensor. This apparatus supplies the current command variable system to a secondary current control. A command variable former calculates the current command variable system ($i_{Rw}$, $i_{Sw}$, $i_{Tw}$) that is manipulated by the inverter, and supplying the current command variable system to the secondary current control. The command variable former has an actual value computer, which receives the output currents ($i_{Rx}$, $i_{Sx}$, $i_{Tx}$) and the state signals ($S_R$, $S_S$, $S_T$) of the current switches of the inverter as inputs. The command variable former has a comparator with a given rotational speed setpoint ($n_{set}$) as a positive input, and a simulated speed ($n_{act}$) as a negative input. The command variable former includes a rotational speed simulator which simulates the rotational speed ($n_{act}$). The rotational speed simulator has an input coupled with the output of the actual value computer, and outputs the simulated rotational speed ($n_{act}$). The command variable former has a transformation device with three inputs, and a rotational speed controller which follows the comparator. The rotational speed controller has an output coupled with the rotational speed simulator, and with one of the inputs of the transformation device. The command variable former includes another comparator and a flux-forming current component controller, which follows this comparator. The flux-forming current component controller is coupled with one of the inputs of the transformation device. Another transformation device with an output coupled to the negative input of the second comparator follows the actual value computer. A flux-forming current component setpoint former has an output coupled with the positive input of the second comparator. Also included is a slip compensator with an input coupled with the output of the rotational speed controller, and another input coupled with the output of the flux-forming current component setpoint former. An adder has an input coupled with the output of the slip compensator, another input coupled with the output of the rotational speed simulator, and an output coupled with one of the inputs of the transformation device.

According to the invention, the current command variable former generates a three-phase sinusoidal current command variable system from the actual values of the inverter output currents, the states of the current switches of the inverter, and a given rotational speed setpoint. The three-phase sinusoidal current command variable system is supplied to a secondary current control. The actual value computer calculates the actual values of the active and reactive currents supplied to the induction machine, initially from the inverter output currents (phase currents of the induction machine), the states of the current switches of the inverter, and the calculated amplitude of the current command variable. The active and reactive currents are subsequently transformed into a torque-forming and a flux-forming current component, which are field-oriented values. The torque-forming and the flux-forming current command variables are generated separately from each other by these field-oriented values. Moreover, the actual rotational speed is determined by a formed acceleration signal. The actual rotational speed is required for determining the command variable of the torque-forming current component. Consequently, this current command variable former generates a current command variable system from the field-oriented regulation using only the actual values of the inverter output currents and the states of the current switches of this inverter. The current command variable system is supplied to a secondary current control that easily controls an induction machine without a rotational speed sensor, achieving very good concentricity even with low rotational speeds.

An apparatus according to the invention for the direct regulation of the output currents of an inverter feeding several induction machines each without a rotational speed sensor comprises a secondary current control and a command variable former. The command variable former calculates a current command variable system ($i_{Rw}$, $i_{Sw}$, $i_{Tx}$) that is manipulated by the inverter, and supplies this current command variable system to the secondary current control. The command variable former comprises an actual value computer with the output currents ($i_{Rx}$, $i_{Sx}$, $i_{Tx}$) and the state signals ($S_R$, $S_S$, $S_T$) of the current switches of the inverter as inputs. A comparator has a given rotational speed setpoint ($n_{nom}$) as the positive input, and a simulated speed ($n_{act}$) as the negative input. A rotational speed simulator simulating a rotational speed ($n_{act}$) has an input coupled with the output of the actual value computer, and outputs the simulated rotational speed ($n_{act}$). The command variable former includes a transformation device with three inputs, and a rotational speed controller following the comparator. The rotational speed controller has an output coupled with the rotational speed simulator and coupled with an input of the transformation device. The command variable former has a second and third comparator, and a voltage controller following the third comparator. The voltage controller has an output coupled to an input of the transformation device. Another transformation device follows the actual value computer, and has an output coupled with the negative input of the third comparator. A setpoint former calculates an output voltage ($U_W$) of the inverter, and has an output coupled with the positive input of the third comparator. A slip compensator has an input coupled with the output of the rotational speed controller, and has another input coupled with the output of the voltage controller. An adder has an input coupled with the output of the slip compensator, has a second input coupled with the output of the rotational speed simulator, and has an output coupled with an input of the transformation device, and coupled with the input of the setpoint former.

According to the present invention, the current command variable former generates a three-phase sinusoidal current command variable system from the actual values of the inverter output currents, the states of the current switches of the inverter, and the rotational speed setpoint. This current command variable system is supplied to a secondary current control. The actual value computer of the current command variable former calculates the actual values of the active and reactive powers supplied to the induction machines, initially from the inverter output currents and the states of the current switches of the inverter. The value of a fundamental-r.m.s. of the inverter output voltage is subsequently calculated from the active and reactive powers by means of a calculated current amplitude of the current command variable. This value of the inverter output voltage at the fundamental frequency is compared with a setpoint of the inverter output voltage, and the command variable of the flux-forming current component is formed as a function of the resulting difference. The torque-forming current component is generated as in the case of regulation of an individual drive. Consequently a group drive that does not use any rotational speed sensors can be approximately regulated with field-oriented variables.

In order to improve the dynamic behavior of the drive in the simulating the actual rotational speed by means of a calculated acceleration signal, this acceleration signal is switched onto the simulated rotational speed. Moreover for determining the phase of the current command variable vector, the load angle is differentiated and this angle change added to the stator frequency and subsequently integrated. This changes the phase of the current command variable corresponding to a load change of the drive.

In order to achieve especially low loss operation of the motor and the inverter in the partial load range, the setpoint of the flux-forming current component is set equal to the command variable of the torque-forming current component. This ensures that the motor under a partial load is operated with a load angle of 45°. In this way, the partial load efficiency of the inverter and the motor is raised to its maximum. This load-adaptive magnetization offers the advantage of the possibility of operating with improved partial load efficiency that is not dependent upon the particular rotational speed/torque relationship of the operating machine but rather can be used in any drive.

A particularly advantageous embodiment of the current command variable former occurs when this current command variable former is a microprocessor. Relative to the analog technique, the microprocessor technique offers the advantage of increased precision, precise selectability, and reproducibility of setpoints and regulating parameters.

In the method and apparatus of the present invention for generating the current command variable system for a secondary current control, and inverter output currents can be regulated directly without needing to detect the rotational speed actual value of the drive (both for individual and group drives). Moreover a voltage intermediate circuit or a current intermediate circuit inverter can be used as the inverter.

DETAILED DESCRIPTION

The figures use the same reference symbols for identical objects.

Figure 1:
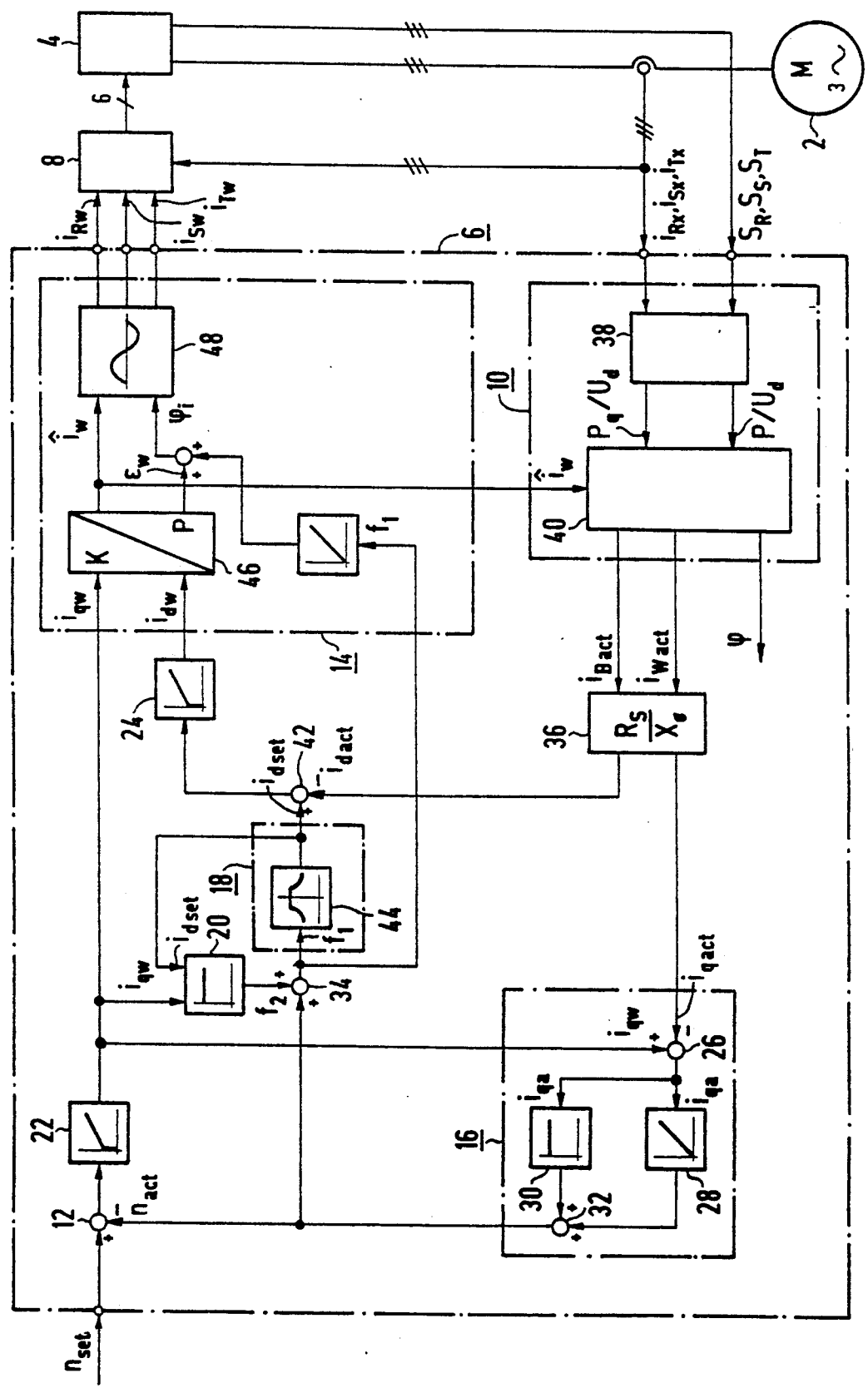
FIG. 1 illustrates an embodiment of the apparatus of the present invention for single motor drive.

FIG. 1 shows an apparatus for directly regulating the inverter output currents $i_{Rx}$, $I_{Sx}$, and $i_{Tx}$ of a frequency converter that feeds an induction machine 2. For the sake of clarity only the load-side inverter 4 of the frequency converter is shown. A voltage intermediate circuit or a current intermediate circuit frequency converter can be used as the frequency converter. The load-side inverter 4 is built with current switches. Transistors or gate turn-off thyristors (GTO thyristors) can be used as the current switches. The states of these current switches are indicated by the state signals $S_R$, $S_S$, and $S_T$.

The regulation comprises a current command variable former 6 and a secondary current control 8. As an example, the current command variable former 6 generates three-phases of a sinusoidal current variable system $i_{Rw}$, $i_{Sw}$, and $i_{Tw}$ for the secondary current control 8 from the inverter output currents $i_{Rx}$, $i_{Sx}$, and $i_{Tx}$, a selectable rotational speed setpoint, $n_{set}$ and the state signals $S_R$, $S_S$, and $S_T$ of the current switches in the inverter. In addition, the actual values of the inverter output currents $i_{Rx}$, $i_{Sx}$, and $i_{Tx}$ are also supplied to the secondary current control which controls the inverter switches by comparing the command currents $i_{Rw}$, $i_{Sw}$, and $i_{Tw}$ and the inverter output currents $i_{Rx}$, $i_{Sx}$, and $i_{Tx}$.

The current command variable former 6 comprises an actual value computer 10 and a first comparator 12 on the input side, and a transformation device 14 on the output side. In addition, the command variable former 6 comprises a rotational-speed simulator 16, a setpoint generator for the flux forming current 18, a slip compensator 20, a rotational speed controller 22, and a flux generating current controller 24. The setpoint generator 18 forms the flux forming current setpoint from the stator frequency $f_1$.

A given rotational speed setpoint $n_{set}$ is connected to the positive input of the first comparator 12 and a simulated rotational speed $n_{act}$ is connected to the negative input of the first comparator 12. The simulated rotational speed $n_{act}$ is formed by the rotational speed simulator 16. The rotational speed controller 22 generates a torque forming current $i_{qw}$ from the rotational speed difference at the output of the comparator 12. This torque forming current $i_{qw}$ is supplied to a positive input of the rotational speed simulator 16, the slip compensator 20, and to the first input of transformation device 14. An actual value of the torque forming current $i_{qact}$ is supplied to the negative input of the rotational speed simulator 16.

The rotational speed simulator 16 has a comparator 26 with positive and negative inputs. The comparator calculates the difference $i_{qa}$ of the command value $i_{qw}$ and of the actual value $i_{qact}$ of the torque forming current. These currents $i_{qw}$ and $i_{qact}$ are equivalent to the motor torque and to the load torque, respectively. Consequently, the current difference $i_{qa}$ is equivalent to the torque difference. This torque difference is equal to the acceleration moment. The equivalent current difference $i_{qa}$ is supplied to an integrator 28 and a proportional controller 30. The outputs of the integrator 28 and the proportional controller 30 are added by an adder 32 which outputs the simulated rotational speed $n_{act}$. The proportional controller 30 significantly improves the dynamic behavior of the drive. This simulated rotational speed $n_{act}$ is also supplied to another adder 34 whose second input is the slip frequency $f_2$. The adder 34 outputs the stator frequency $f_1$ which is then supplied to the transformation device 14.

The actual value of the torque-forming current $i_{qact}$ is one of the two field-oriented variables which is generated by the input-side actual value computer 10 and a succeeding transformation device 36 from the inverter output currents $i_{Rx}$, $i_{Sx}$, and $i_{Tx}$ and the state signals $S_R$, $S_S$, and $S_T$ of the inverter switches.

The actual value computer 10 comprises a power detector 38 and an actual value computing device 40. The structure of the power detector 38 is described in detail in DE 35 04 623 Al. The power detector 38 outputs the active power $P/U_d$ and the reactive power $P_q/U_d$, which relate to the intermediate circuit voltage $U_d$. From these values, the actual value computing device 40 calculates the actual values of the active current $i_{Wact}$ and the reactive current $i_{Bact}$ that are supplied to the motor and the phases. These actual values are calculated by the following equations.

$$\tan\phi = \frac{P_q/U_d}{P/U_d} = \frac{P_q}{P}$$

$$i_{Wact} = \uparrow_w \cdot \cos\phi = \frac{\uparrow_w}{\sqrt{1 + \tan^2\phi}}$$

$$i_{Bact} = \uparrow_w \cdot \sin\phi = i_{Wact} \cdot \tan\phi$$

$$\phi = \arctan P_q/P$$

The actual values of the torque forming current $i_{qact}$ and the flux-forming current $i_{dact}$ components of the motor current are formed from the actual values of the active $i_{Wact}$ and reactive $i_{Bact}$ currents via a transformation that is a function of the winding resistance $R_S$ of the stator winding and the leakage inductance $X_6$.

The actual value of the flux-forming current component $i_{dact}$ is supplied to the negative input of a another comparator 42 which has the setpoint of the flux-forming current component $i_{dnom}$ as a positive input. This setpoint $i_{set}$ is derived from a characteristic of the output frequency (stator frequency) $f_1$ by a load-independent setpoint calculator 44 of the current setpoint, calculator 18 which also outputs the setpoint $i_{set}$. This setpoint $i_{set}$ is also supplied to the slip compensator 20. The command value of the flux-forming current component $i_{dw}$ is generated from the difference of setpoint $i_{set}$ and actual value $i_{dact}$ by the current controller 24.

The value $\uparrow_w$ and the load angle $\epsilon_w$ are formed from the field-oriented command variables $i_{qw}$ and $i_{dw}$ and the stator frequency $f_1$ initially by the transformation device 14. The amplitude $_w$ and the load angle $\epsilon_w$ are obtained from the field-oriented current components $i_{qw}$ and $i_{dw}$ by a Cartesian to Polar (K/P) converter 46. The current phase angle $\phi_i$ of the current vector $i_S$ is obtained from this load angle $\epsilon_w$ and the integral of the stator frequency $f_1$. A three-phase sinusoidal command variable system $i_{Rw}$, $i_{Sw}$, and $i_{Tw}$ is formed from this current phase angle $\phi$hd i and the amplitude $\uparrow_w$ by means of a command variable system former 48.

Figure 2:
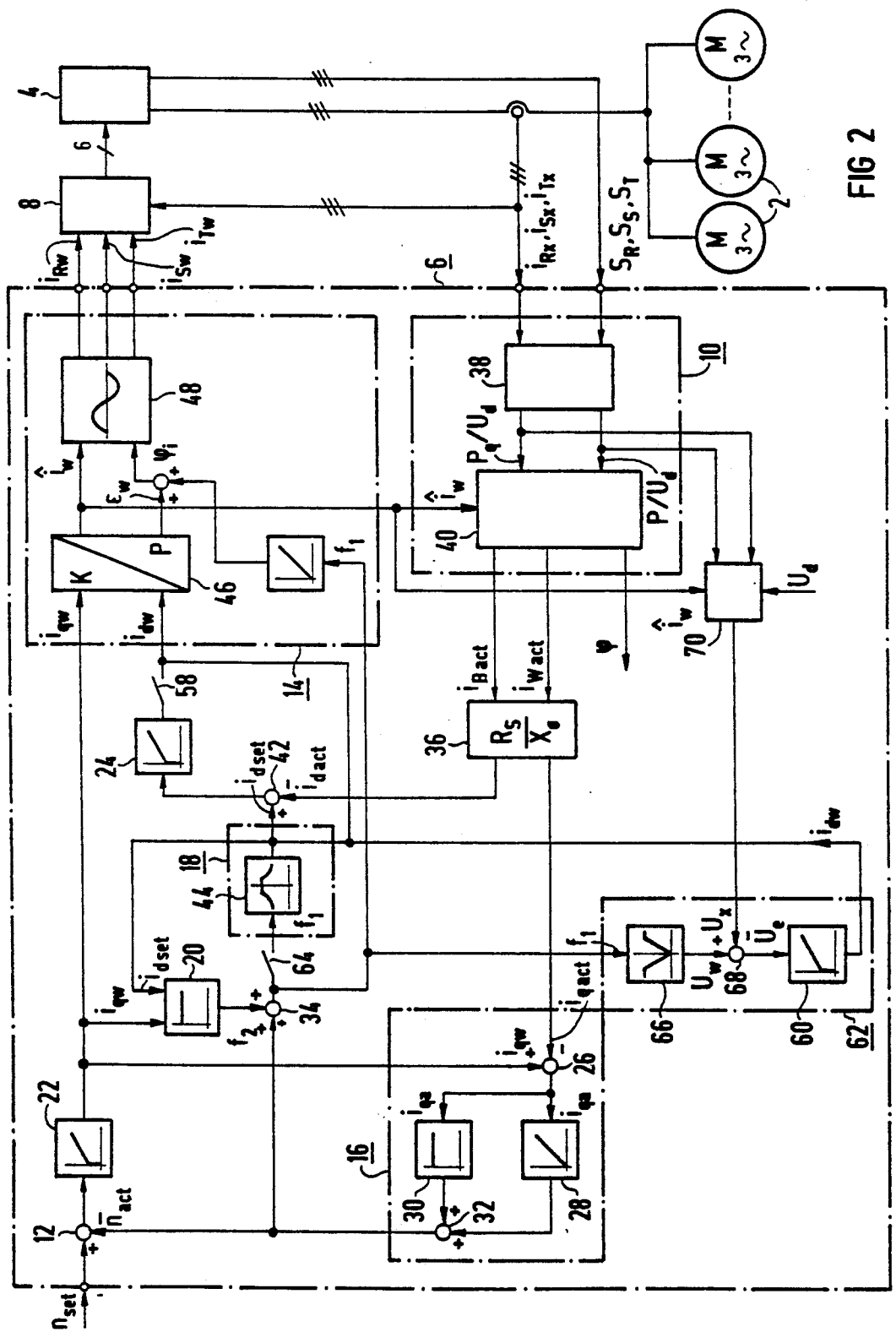
FIG. 2 illustrates an embodiment of the apparatus of the present invention for a group drive.

FIG. 2 represents a circuit for the direct regulation of inverter output currents $i_{Rx}$, $i_{Sx}$, $i_{Tx}$ of an inverter 4 feeding several induction machines 2. Compared to the circuit configuration of FIG. 1, a switch 58 follows the current controller 24. The output of the switch 58 is connected to an input of the transformation device 14 and also to an output of a voltage controller 60 of a voltage control unit 62. The adder 34 is also followed by a switch 64 whose output is connected with the input of the setpoint current calculator 18. The output of adder 34 is electrically connected with the transformation device 14 and with a setpoint former 66 for the inverter output voltage $U_w$. The output of the voltage controller 60 is connected with an input of the slip compensator 20. The switches 58 and 64 are synchronized with each other, so that they open and close simultaneously. Electrically actuated switches, such as transistors, can be used as switches 58 and 64 which are switched off by means of a pulse generated by the actuation of a key "group control" in an operator control panel of the frequency converter. The setpoint former 66 is followed by a third comparator 68 whose output is connected to the input of the following voltage controller 60 and whose negative input is connected to the output of another transformation device 70. The block diagram of the second transformation device 70 is shown in more detail in FIG. 7. The inputs of the transformation device 70 are the calculated relative active and reactive powers P/U and P/U from the actual value computer 10, and an absolute value $\uparrow_w$ of a calculated stator-oriented current vector $i_S$ from the output of the transformation device 14. In addition the value of the intermediate circuit voltage $U_d$ of the frequency converter is supplied since the actual value computer 10 calculates the active and reactive powers relative to the intermediate circuit voltage $U_d$. The transformation device 70 outputs the value of the fundamental — r.m.s. of the inverter output voltage $U_x$ which is compared with a setpoint of the inverter output voltage $U_w$. The setpoint $U_w$ is determined as a function of the stator frequency $f_1$ by means of the setpoint former 66. This setpoint former has stored in it the characteristics for different drives (constant torque drive, turbo machine drive). The resulting regulating difference value $U_e$ is supplied to the voltage controller 60 which outputs a command value of the flux-forming current component $i_{dw}$ which is supplied to the input of the transformation device 14. This command value of the flux-forming current component $i_{dw}$ is changed by means of the voltage controller 60 until the value of a fundamental-r.m.s. of the inverter output voltage $U_x$ agrees with the setpoint of the inverter output voltage $U_w$.

Figure 3:
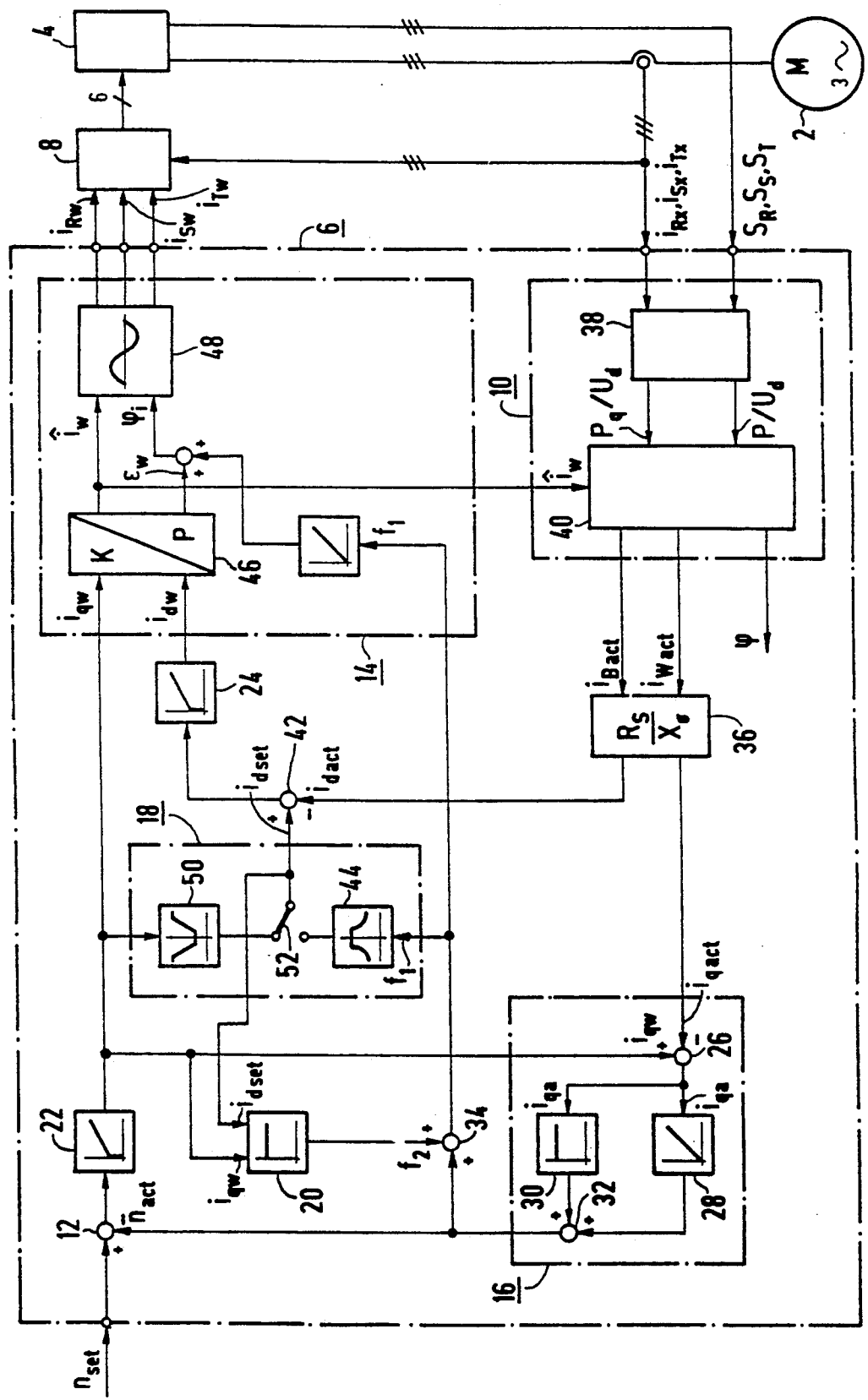
FIG. 3 illustrates an advantageous embodiment of the apparatus of the present invention of FIG. 1.

FIG. 3 represents an advantageous circuit for the direction regulation of inverter output currents $i_{Rx}$, $i_{Sx}$, and $i_{Tx}$. This circuit differs from the circuit of FIG. 1 in that the current setpoint, calculator 18 has a load-dependent setpoint former 50 and a switch 52. The torque-forming current component $i_{qw}$ generated by the rotational-speed controller 22 is supplied to the load-dependent setpoint former 50. In the case of partial loads the setpoint of the flux-forming current component $i_{set}$ is set equal to the command value of the torque-forming current component $i_{qw}$. This ensures that the motor is magnetized according to load. Frequency converter and motor are then operated with the lowest possible loss, i.e. the active and the reactive current are then of equal magnitude. Since the magnetization never should exceed a minimum or maximum with particularly low or particularly large loads of the drive, the magnetization is corrected via a characteristic. This means under partial loads, the load-dependent setpoint former 50 is connected by the switch 52 with the comparator 42, whereas outside of this partial load range the load-independent nominal value former 44 is connected with the comparator 42 by the switch 52. Consequently, not only drives with known and fixed rotational speed/torque characteristics, but also any given drive can be operated with decreased power loss.

Figure 4:
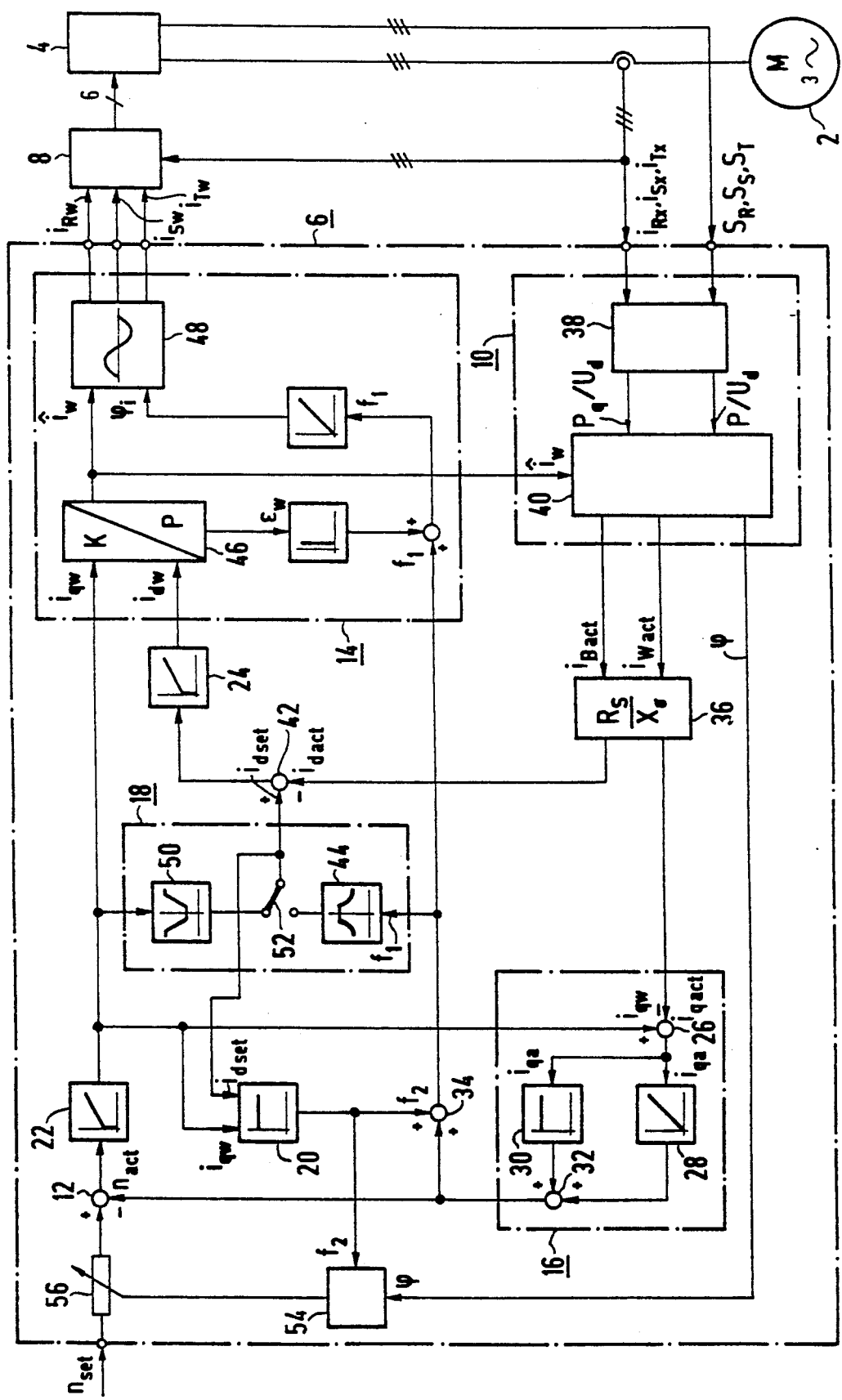
FIG. 4 illustrates another advantageous embodiment of the apparatus of the present invention of FIG. 1.

FIG. 4 represents another advantageous circuit for the direct regulation of the inverter output currents $i_{Rx}$, $i_{Sx}$, and $i_{Tx}$. This circuit differs from the circuit configuration according to FIG. 3 in that a pull-out protection device 54 is present. This commutation failure protection device 54 is connected with the actual value computer 10 and with the slip compensator 20 and outputs to a setpoint setting element 56. The pull-out protection device 54 compares the slip frequency $f_2$ with a predetermined stored pull-out slip frequency $f_{sk}$ or a frequency $f_\phi$ corresponding to the phase angle $\phi$ of the predetermined pull-out slip frequency $f_{sk}$. As soon as the slip frequency $f_2$ or the frequency $f_{100}$ reaches a predetermined value below the pull-out frequency $f_{sk}$, the setpoint setting element 56 decreases the rotational speed setpoint $n_{set}$ with motor operation. This means in order to prevent the pull-out of a drive under load torque (the value of this torque can correspond for example to 90% of the value of the pull-out torque it is necessary to decrease the rotational speed setpoint $n_{set}$ as quickly as possible, perhaps suddenly, thus decreasing the magnitude of the slip. The pull-out protection device 54 and the setpoint setting element 56 achieve sudden reduction capability. With high dynamic demands, the evaluation of the phase angle $\phi$ must be given priority in order to recognize the danger of pull-out of a drive under load.

Figure 5:
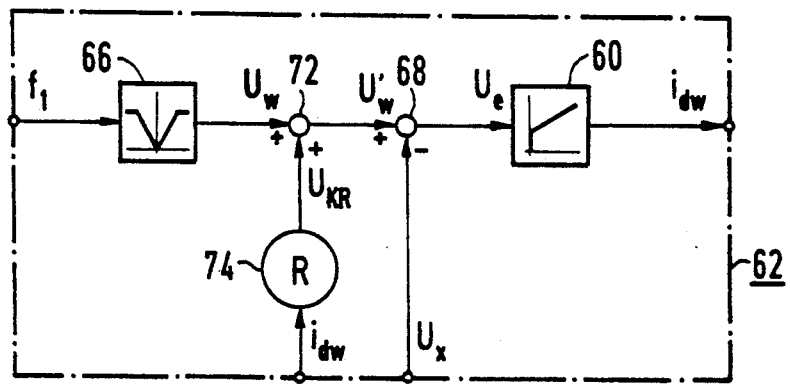
FIG. 5 illustrates a segment of an advantageous embodiment of the apparatus of the present invention of FIG. 2.

FIG. 5 shows an advantageous implementation of the voltage control unit 62 of the circuit according to FIG. 2. In this circuit, the setpoint former 66 is followed by an adder 72 whose output is connected to the positive input of the third comparator 68. The second input of the adder 72 is connected to the output of a constant element 74. The command value of the flux-forming current component $i_{dw}$ is present at the input of this constant element 74. The constant element 74 is set to a value R corresponding to the sum value of the stator resistances of the several induction machines 2, when the number of motors 2 is predetermined. At the output of the constant element 74 a correction value $U_{KR} = i_{dw}R$ is generated, which is combined with the setpoint of the inverter output voltage $U_w$. This compensates for the voltage drops from the motor feed lines and the winding resistances of the stator windings of the induction machines 2.

Figure 6:
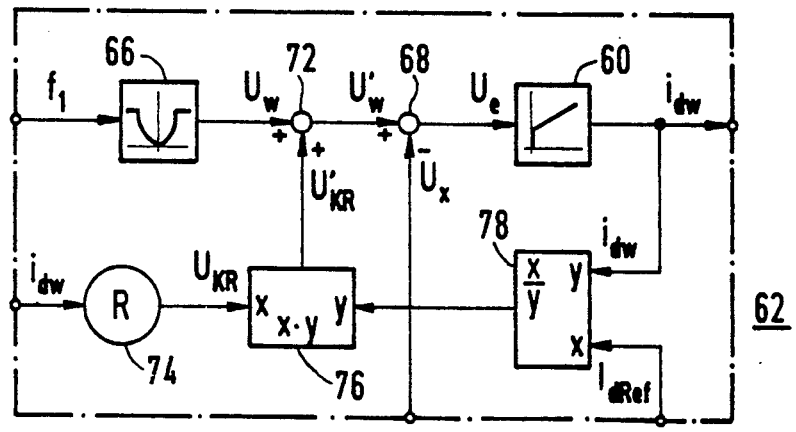
FIG. 6 illustrates a segment of an especially advantageous embodiment of the apparatus of the present invention of FIG. 2.

In FIG. 6 a particularly advantageous implementation of the voltage control unit 62 of the circuit of FIG. 2 is shown in more detail. In this implementation the assumption is made that the compensation is a function of the inverter output current or a function of the active component of this current. If a motor 2 from the motor group is switched off, the nominal value for the inverter output voltage $U_w$ would be reduced since the correction value $U_{KR}$ becomes smaller. For this reason it is useful to introduce a new correction value $U_{KR'}$ instead of the correction value $U_{KR}$. This new correction value $U_{KR'}$, carries out a weighting of the original compensation with the ratio of the flux-forming current component $I_{dRef}$ (assumed on starting initial operation of the group drive, also called the flux-forming reference current component $I_{dRef}$), to the current command value of the flux-forming current component $i_{dw}$ given by the voltage controller 60. Instead of the flux-forming current component $i_{dw}$, the corresponding reactive currents can also be used. This weighting of the original compensation occurs by following the constant element 74 with a multiplier 76. The output of this multiplier 76 is connected with the second input of the adder 72. The second input of the multiplier 76 is preceded by a divider 78 whose first input is the flux-forming reference current component $I_{dRef}$ and whose second input is the output of the voltage controller 60 $i_{dw}$.

Figure 7:
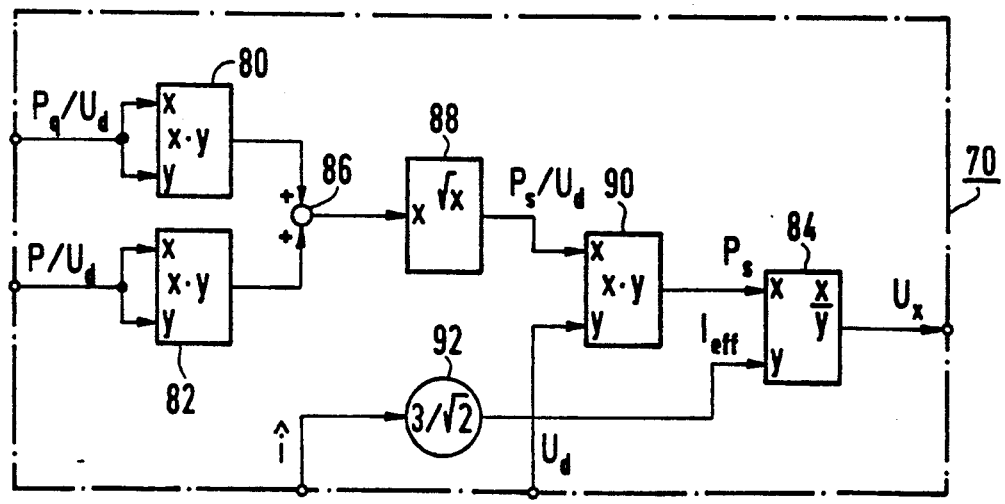
FIG. 7 illustrates a block circuit diagram of one of the transformation devices of the circuit configuration according to FIG. 2.

FIG. 7 illustrates a block diagram of the second transformation device 70. This transformation device 70 has side two squares 80 and 82 at the input side and a divider 84 at the output-side. The outputs of the two squarers 80 and 82 are connected with each other by an adder 86 whose output is connected with a square root calculator 88. The square root calculator 88 is followed by a multiplier 90 whose output is connected with the first input of the divider 84. The value of the intermediate circuit voltage $U_d$ of the frequency converter is present at the second input of the multiplier 90. The second input of the divider 84 is preceded by a constant element 92 which has as an input an absolute value $\uparrow_w$ of the stator-oriented current vector $i_S$. This circuit determines the value of the inverter output voltage at the fundamental frequency from the actual values of the active and reactive powers $P/U_d$ and $Pq/U_d$, in each instance relative to the value of the intermediate circuit voltage $U_d$. By means of the value of a fundamental-r.m.s. of the inverter output voltage $U_x$, the regulator recognizes whether or not the motors of the group drive are connected to or away from the group drive, or whether the operating points of the individual motors are moving away from each other. If for example motors are switched away from the group drive, then the value of a fundamental-r.m.s. of the inverter output voltage $U_x$ increases. Thereby the regulating difference $U_e$ and the command value of the flux-forming current component $i_{dw}$ are lowered until the inverter output voltage value of a fundamental-r.m.s. of the $U_x$ becomes equal to the nominal value $U_w$ of the inverter output voltage, which is predetermined as a function of the inverter frequency $f_1$.

What is claimed is:

1. A method for direct regulation of output currents $(i_{Rx}, i_{Sx}, i_{Tx})$ of an inverter, having a plurality of current switches, and feeding an induction machine without a rotational speed sensor, through a secondary current control, comprising the steps of:

a) sensing a plurality of stator currents $(i_{Rx}, i_{Sx}, i_{Tx})$;

b) obtaining a corresponding plurality of state signals $(S_R, S_S, S_T)$ from the plurality of current switches of the inverter;

c) calculating an actual value of an active current $(i_{Wact})$ and an actual value of a reactive current $(i_{Bact})$ from said plurality of stator currents $(i_{Rx}, i_{Sx}, i_{Tx})$ and state signals $(S_R, S_S, S_T)$;

d) converting said actual value of the active current $(i_{Wact})$ <into an actual value of a torque-forming current $(i_{qact})$> and said actual value of the reactive current $(i_{Bact})$ and into an actual value of the flux-forming current $(i_{dact})$;

e) simulating an actual value of a rotational speed $(n_{act})$ by using the actual value of the torque-forming current $(i_{qact})$ and the setpoint of the torque-forming current $(i_{gw})$;

f) comparing a given rotational speed setpoint $(n_{set})$ with said simulated actual rotational speed $(n_{act})$;

g) generating a torque-forming current $(i_{qw})$ from said comparing in step (f);

h) comparing a flux-forming current setpoint $(i_{set})$ given as a function of a stator frequency $(f_1)$ of the induction machine with said actual value of a flux-forming current $(i_{dact})$;

i) generating a flux-forming current $(i_{dw})$ from said comparing in step (h);

j) transforming said flux-forming and torque-forming currents $(i_{qw}, i_{dw})$, which are field-oriented currents, into a stator-oriented current vector $(i_S)$;

k) converting said stator-oriented current vector $(i_S)$ into a current command variable system $(i_{Rw}, i_{Sw}, i_{Tw})$; and l) supplying said current command variable system $(i_{Rw}, i_{Sw}, i_{Tw})$ to the subordinate current controller.

2. The method according to claim 1, further comprising calculating the actual values of the active and reactive currents ($i_{Wact}$, $i_{Bact}$) according to the following equations;

$$i_{Wact} = \uparrow_w * \cos\phi = \frac{\uparrow_w}{\sqrt{1 + \tan^2\phi}}$$

$$i_{Bact} = \uparrow_w * \sin\phi = i_{Wact} * \tan\phi$$

wherein $\uparrow_w$ = absolute value of stator-oriented current vector, and $$\tan\phi = \frac{P_q/U_d}{P/U_d} = \frac{P_q}{P} \text{; and}$$

determining the active and reactive powers ($P_q$, $P$) relative to an intermediate circuit voltage ($U_d$) from a plurality of phase currents ($i_{Rx}$, $i_{Sx}$, $i_{Tx}$) and a corresponding plurality of state signals ($S_R$, $S_S$, $S_T$) of the inverter switches.

3. The method according to claim 1, wherein the step of generating the flux-forming current ($i_{dw}$) further comprises setting the flux-forming current setpoint ($i_{set}$) equal to the torque-forming current ($i_{qw}$) for a predetermined load range.

4. The method according to claim 1, wherein the step of simulating the actual rotational speed ($n_{act}$) of the induction machine further comprises determining an acceleration torque ($i_{qa}$) from a difference of the torque-forming current and the actual value of the torque-forming current ($i_{qw}$ and $i_{qact}$) and integrating said acceleration moment.

5. The method according to claim 4, further comprising the step of adding the acceleration moment ($i_{qa}$) to the simulated actual rotational speed ($n_{act}$).

6. The method according to claim 1, further comprising:

a) calculating a phase angle $\phi$ between a plurality of phase currents ($i_{Rx}$, $i_{Sx}$, $i_{Tx}$) and a corresponding plurality of phase voltages ($U_{Rx}$, $U_{Sx}$, $U_{Tx}$) using the active and reactive power ($P_{lq}$, $P_q$) relative to an intermediate circuit voltage ($U_d$) according to the following equation:

$$\phi = \arctan\frac{P_q/U_d}{P/U_d} \text{; and}$$

b) converting said phase angle $\phi$ to a frequency ($f_\phi$);
c) comparing said frequency ($f_\phi$) with a predetermined pull-out slip frequency ($f_{sk}$); and
d) changing the rotational speed setpoint ($n_{set}$) when the frequency ($f_\phi$) reaches a predetermined value below the pull-out slip frequency ($f_{sk}$).

7. A method for the direct regulation of output currents ($i_{Rx}$, $i_{Sx}$, $i_{Tx}$) of an inverter having a plurality of current switches, and feeding several induction machines without a rotational speed sensor, through a secondary current control comprising the steps of:

a) sensing a plurality of output currents ($i_{Rx}$, $i_{Sx}$, $i_{Tx}$);
b) obtaining a corresponding plurality of state signals ($S_R$, $S_S$, $S_T$) from the plurality of current switches of the inverter;
c) calculating an actual value of an active power ($P/U_d$) and an actual value of a reactive power ($P_q/U_d$) supplied to the induction machines from said plurality of output currents ($i_{Rx}$, $i_{Sx}$, $i_{Tx}$) and state signals ($S_R$, $S_S$, $S_T$);
d) calculating an actual value of a fundamental-r.m.s. of an output voltage ($U_x$), an actual value of an active current ($i_{Wact}$), and an actual value of a reactive current ($i_{qact}$), from said actual values of the active and reactive powers by using an absolute value of stator-oriented current vector ($\uparrow_w$);
e) converting said actual value of an active current ($i_{Wact}$) <into an actual value of a torque-forming current ($i_{qact}$)> and said actual value of the reactive current ($i_{Bact}$) and into an actual value of a flux-forming current ($i_{dact}$);
f) simulating an actual rotational speed ($n_{act}$) by using an actual value of a torque-forming current ($i_{qact}$) and the setpoint of the torque-forming current ($i_{qw}$);
g) comparing a given rotational speed setpoint ($n_{set}$) with said simulated actual rotational speed ($n_{act}$);
h) generating a torque-forming current ($i_{qw}$) from the comparing in step (g);
i) comparing a output voltage setpoint ($U_w$) of the inverter, given as a function of a stator frequency ($f_1$) of the induction machines, with an actual value of a fundamental-r.m.s. of the output voltage of the inverter;
j) generating a flux-forming current ($i_{dw}$) from the comparing in step (i);
k) transforming said flux-forming and torque-forming currents ($i_{qw}$, $i_{dw}$), which are field-oriented currents, into a stator-oriented current vector ($i_S$);
l) converting said stator-oriented current vector ($i_S$) into a current command variable system ($i_{Rw}$, $i_{Sw}$, $i_{Tw}$); and
m) supplying said current command variable system ($i_{Rw}$, $i_{Sw}$, $i_{Tw}$) to the subordinate current controller.

8. The method according to claim 7, further comprising calculating the actual values of the active and reactive currents ($i_{Wact}$, $i_{Bact}$) according to the following equations:

$$i_{Wact} = \uparrow_w * \cos\phi = \frac{\uparrow_w}{\sqrt{1 + \tan^2\phi}}$$

$$i_{Bact} = \uparrow_w * \sin\phi = i_{Wact} * \tan\phi$$

wherein $\uparrow_w$ = absolute value of stator-oriented current vector, and $$\tan\phi = \frac{P_q/U_d}{P/U_d} = \frac{P_q}{P} \text{; and}$$

determining the active and reactive powers ($P_q$, $P$) relative to an intermediate circuit voltage ($U_d$) from a plurality of phase currents ($i_{Rx}$, $i_{Sx}$, $I_{Tx}$) and a corresponding plurality of state signals ($S_R$, $S_S$, $S_T$) of the inverter switches.

9. The method according to claim 7, further comprising:

a) calculating a correction value ($U_{KR}$) as a function of the torque-forming current ($i_{qw}$); and
b) compensating for a voltage drop across a motor feed line and a voltage drop across a winding resistance (R) of a stator winding of the induction machine by adding said correction value ($U_{KR}$) to the nominal value of the output voltage ($U_w$) of the inverter.

10. The method according to claim 7, wherein the step of simulating the actual rotational speed ($n_{act}$) of the induction machine further comprises determining an acceleration torque ($i_{qa}$) from a difference of the torque-forming current and the actual value of the torque-forming current ($i_{qw}$ and $i_{qact}$) and integrating said acceleration moment.

11. The method according to claim 10, further comprising the step of adding the acceleration torque ($i_{qa}$) to the simulated actual rotational speed ($n_{act}$).

12. The method according to claim 7, further comprising:
   a) calculating a phase angle $\phi$ between a plurality of phase currents ($i_{Rx}$, $i_{Sx}$, $i_{Tx}$) and a corresponding plurality of phase voltages ($U_{Rx}$, $U_{Sx}$, $U_{Tx}$) using the active and reactive power ($P_q$, $P$) relative to an intermediate circuit voltage ($U_d$) according to the following equation:

$$\phi = \arctan \frac{P_q/U_d}{P/U_d} \text{ ; and}$$

b) converting said phase angle $\phi$ to a frequency ($f_\phi$);
   c) comparing said frequency ($f_\phi$) with a predetermined pull-out slip frequency ($f_{sk}$); and
   d) changing the rotational speed setpoint ($n_{set}$) when the frequency ($f_\phi$) reaches a predetermined value below the pull-out slip frequency ($f_{sk}$).

13. The method according to claim 9 further comprising weighting the correction value ($U_{KR}$) with a ratio of a flux-forming reference current ($i_{dRef}$) to the flux-forming current ($i_{dw}$) to form a weighted correction value ($U_{KR}'$); and combining said weighted correction value ($U_{KR}'$) with the output voltage setpoint ($U_w$) of the inverter.

14. An apparatus for the direct regulation of output currents ($i_{Rx}$, $i_{Sx}$, $i_{Tx}$) of an inverter that has a plurality of current switches, and feeds an induction machine without a rotational speed sensor, comprising:
   a) a secondary current control;
   b) a command variable former calculating a current command variable system ($i_{Rw}$, $i_{Sw}$, $i_{Tw}$) that is manipulated by the inverter, and supplying said current command variable system to the secondary current control, said command variable former comprising:
      1) an actual value computer receiving as inputs a plurality of output currents ($i_{Rx}$, $i_{Sx}$, $i_{Tx}$) and a plurality of state signals ($S_R$, $S_S$, $S_T$) of said plurality of current switches of the inverter, and having an output;
      2) a first comparator having as a positive input a given rotational speed setpoint ($n_{set}$), and having a negative input;
      3) a rotational speed simulator simulating the actual rotational speed ($n_{act}$), having an input coupled with said output of the actual value computer, and outputting the simulated rotational speed ($n_{act}$) to the negative input of the first comparator;
      4) a first transformation device having first, second and third inputs;
      5) a rotational speed controller following said first comparator having an output coupled to said rotational speed simulator, and to the first input of said first transformation device;
      6) a second comparator having a positive input and a negative input;
      7) a flux-forming current component controller following said second comparator, and coupled to said second input of the first transformation device;
      8) a second transformation device having an output coupled to the negative input of said second comparator, following said actual value computer;
      9) a flux-forming current component setpoint former having an output coupled to the positive input of said second comparator;
      10) a slip compensator having a first input coupled to said output of the rotational speed controller, having a second input coupled with the output of said flux-forming current component setpoint former, and having an output;
      11) a first adder having a first input coupled with the output of said slip compensator, having a second input coupled with said output of the rotational speed simulator, and having an output coupled with the third input of the transformation device.

15. The apparatus according to claim 14 further comprising:
   a) a flux-forming current component controller having an output;
   b) a first switch following said flux-forming current component controller, and coupling the second input of the first transformation device with the output of the flux-forming current component controller and with the output of the voltage controller
   c) a second switch following the first adder, and coupling the output of the first adder with the flux-forming current component setpoint former and with the output voltage setpoint former.

16. The apparatus according to claim 14, wherein the actual value computer comprises a power detector and an actual value computing device.

17. The apparatus according to claim 14 wherein the rotational speed simulator comprises:
   a) an integrator having an output; and
   b) a comparator having as a negative input a torque-forming current component actual value ($i_{qact}$), having as a positive input a torque-forming current component command value ($i_{qw}$), and having an output coupled with said integrator.

18. The apparatus according to claim 17 further comprising:
   a) a proportional controller being coupled with the output of the comparator, and having an output;
   b) a second adder coupling the output of the proportional controller with the output of the integrator.

19. The apparatus according to claim 14, wherein the first transformation device comprises a cartesian-to-polar (K/P) converter and a command variable system generator.

20. The apparatus according to claim 14 wherein the flux-forming current components setpoint former comprises:
   a) a load-dependent setpoint former having an output;
   b) a load-independent setpoint former having an output; and
   c) a switch coupling the outputs of the load-dependent and load-independent nominal value formers, as a function of a load, with the output of the flux-forming current components setpoint former.

21. The apparatus according to claim 14 further comprising:
   a) a setpoint setting element having an input; and b) a pull-out protection device having a first input coupled with the actual value computer, having a second input coupled with the slip compensator, and having an output coupled with said setpoint setting element.

22. An apparatus for the direct regulation of output currents ($i_{Rx}$, $i_{Sx}$, $i_{Tx}$) of an inverter that has a plurality of current switches, and feeds several induction machines without rotational speed sensors, comprising:
a) a secondary current control;
b) a command variable former calculating a current command variable system ($i_{Rw}$, $i_{Sw}$, $i_{Tw}$) that is manipulated by the inverter, and supplying said current command variable system to the secondary current control, said command variable former comprising:
1) an actual value computer having as inputs a plurality of output currents ($i_{Rx}$, $i_{Sx}$, $i_{Tx}$) and a plurality of state signals ($S_R$, $S_S$, $S_T$) of the plurality of current switches of the inverter, and having an output;
2) a first comparator having as a positive input a given rotational speed setpoint ($N_{set}$), and having a negative input;
3) a rotational speed simulator simulating a rotational speed ($n_{act}$), having an input coupled with said output of the actual value computer, and outputting the simulated actual rotational speed ($n_{act}$) to the negative input of the first comparator;
4) a first transformation device having first, second and third inputs;
5) a rotational speed controller following said first comparator, and having an output coupled with said rotational speed simulator and coupled with the first input of said first transformation device;
6) a second comparator having a positive input and a negative input;
7) a third comparator having a positive and negative input;
8) a voltage controller following said third comparator, having an output coupled to said second input of the first transformation device;
9) a second transformation device following said actual value computer, and having an output coupled to the negative input of said third comparator;
10) a setpoint former calculating an output voltage ($U_w$) of the inverter, having an input ,and having an output coupled to the positive input of the third comparator;
11) a slip compensator having a first input coupled to said output of the rotational speed controller, having a second input coupled with the output of the voltage controller, and having an output;
12) an first adder having a first input coupled with the output of said slip compensator, having a second input coupled with said output of the rotational speed simulator, and having an output coupled with the third input of the first transformation device, and coupled with the input of the flux-forming current component setpoint former.

23. The apparatus according to claim 22 further comprising:
a) a flux-forming current component controller having an output;
b) a first switch following said flux-forming current component controller, and coupling the second input of the first transformation device with the output of the flux-forming current component controller and with the output of the voltage controller;
c) a second switch following the first adder, and coupling the output of the first adder with the flux-forming current component setpoint former and with the output voltage setpoint former.

24. The apparatus according to claim 22 wherein the actual value computer comprises a power detector and an actual value computing device.

25. The apparatus according to claim 22, wherein the rotational speed simulator comprises:
a) an integrator having an output; and
b) a comparator having as a negative input a torque-forming current component actual value ($i_{qact}$), having as a positive input a torque-forming current component command value ($i_{qw}$), and having an output coupled with said integrator.

26. The apparatus according to claim 25, further comprising:
a) a proportional controller being coupled with the output of the comparator, and having an output;
b) a second adder coupling the output of the proportional controller with the output of the integrator.

27. The apparatus according to claim 22, wherein the first transformation device comprises a cartesian-to-polar (K/P) converter and a command variable system generator.

28. The apparatus according to claim 22, further comprising:
a) a rotational speed setpoint setting element having an input; and
b) a pull-out protection device having an first input coupled with the actual value computer, having a second input coupled with the slip compensator, and having an output coupled with said rotational speed setpoint setting element.

29. The apparatus according to claim 22, wherein the second transformation device further comprises:
a) a first squarer having an output;
b) a second squarer having an output;
c) an second adder having as inputs the outputs of the first and second squarers, and having an output;
d) a root former having as an input the output of the second adder, and having an output;
e) a multiplier having as a first input the output of the root former, having as a second input a value of an intermediate circuit voltage ($U_d$), and having an output;
f) a divider having a first input coupled with the output of the multiplier, and having a second input; and
g) a constant element having as an input an absolute value ( ↑ ) of a stator-oriented stator current vector ($i_s$), and having an output coupled with the second input of the divider.

30. The apparatus according to claim 22, further comprising:
a) a constant element having as an input a command value of a flux-forming current component ($i_{dw}$), and having an output; and
b) a second adder having as a first input the output of said command value former, having as a second input the output of the constant element, and having an output coupled with the positive input of the third comparator.

31. The apparatus according to claim 22, further comprising:
a) a constant element having as an input a command value of a flux-forming current component ($i_{dw}$), and having an output;
b) a multiplier having as a first input the output of the constant element, having as a second input, and having an output; and
c) a second adder having as a first input the output of the command value former, having as a second input the output of the multiplier, and having an output coupled with the positive input of the third comparator; and
d) a divider having as a first input the command value of the flux-forming reference current component ($i_{dRef}$), having as second input the output of the voltage controller, and having an output coupled with the second input of the multiplier.

32. The apparatus according to claim 22, wherein said command value former comprises a characteristic sensor.

* * * * *